Aug. 4, 1936.  L. S. GREGORY  2,049,699

GAS CONVERTING FURNACE

Filed Aug. 6, 1934

Inventor
Lon S. Gregory

By Jack Athley
Attorney

Patented Aug. 4, 1936

2,049,699

UNITED STATES PATENT OFFICE 2,049,699

GAS CONVERTING FURNACE

Lon S. Gregory, Tulsa, Okla., assignor to
Harold C. Price, Bartlesville, Okla.

Application August 6, 1934, Serial No. 738,659

4 Claims. (Cl. 219—36)

This invention relates to new and useful improvements in gas converting furnaces.

One object of the invention is to provide an improved furnace wherein the boiling point of a chemical is utilized to maintain a desired temperature, also wherein adjustments are eliminated, fire hazards are reduced to a minimum, and electrical equipment and excessive wiring are obviated.

Another object of the invention is to provide a furnace having a passage extending therethrough and arranged to conduct a liquid through a zone containing a chemical having a high boiling point, so that by maintaining said chemical at its boiling point or substantially so, the liquid is converted into a gas.

Another object of the invention is to provide a furnace having means for producing a predetermined constant temperature therein, which employs a chemical having a predetermined boiling point of substantially the same temperature as that which is desired in the furnace, for bringing about a heat exchange in a liquid going through a passage contiguous to said chemical, whereby the liquid will be constantly subjected to said predetermined temperature, thus converting the liquid into a gas in a more efficient manner and also reducing the decadent carbon deposit which would otherwise interfere with the heat exchange.

A further object of the invention is to provide a furnace utilizing an electrically heated chemical capable of maintaining a constant temperature when held substantially at its boiling point, together with means providing for the expansion of said chemical whereby its excess heat may be dissipated, thus assuring approximately a constant temperature within the furnace, which is obtained without the use of moving parts or any other manipulated controls.

A construction designed to carry out the invention will be hereinafter described, together with other features of the invention.

Figure 1:
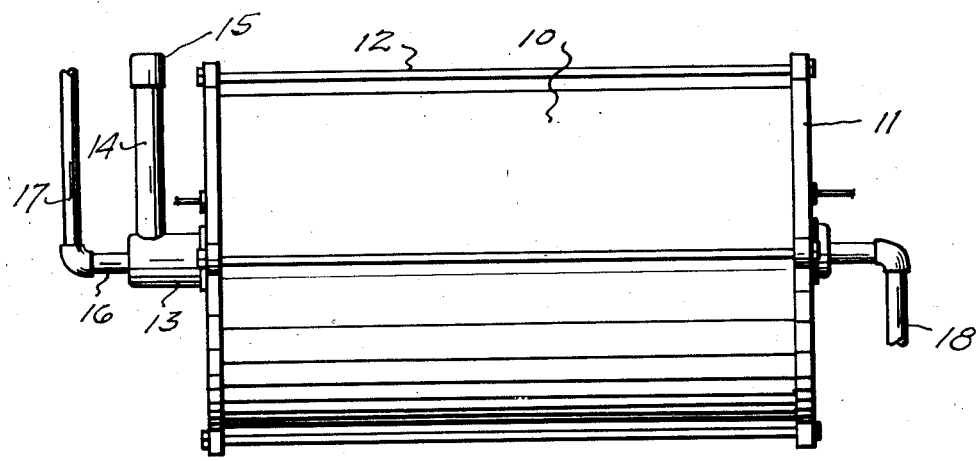
Figure 2:
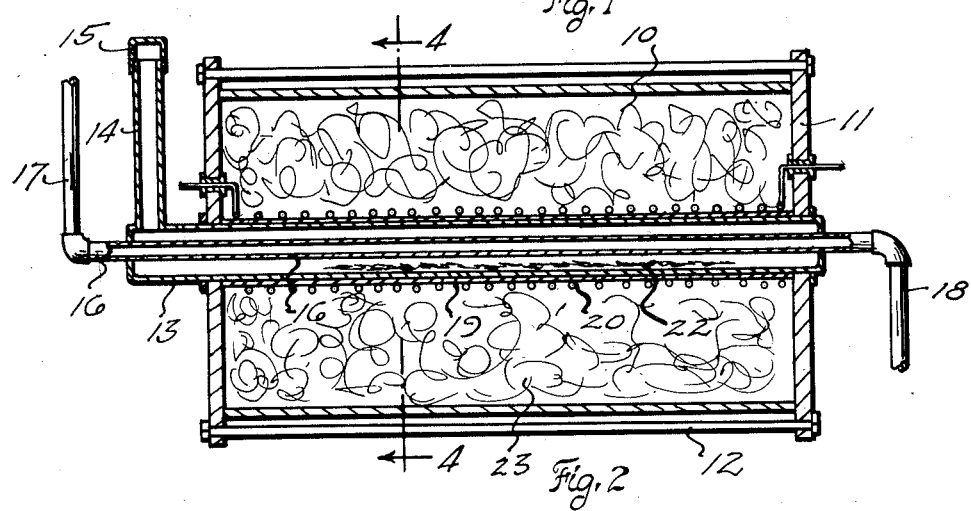
Figure 3:
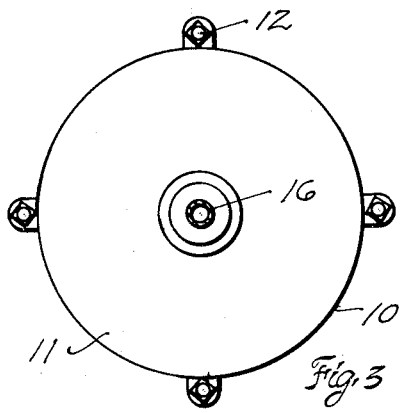
Figure 4:
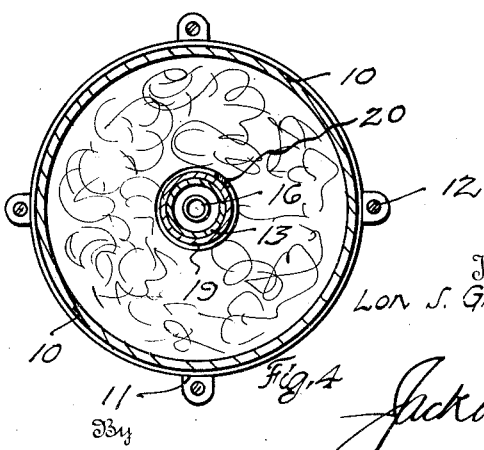

The invention will be more readily understood from a reading of the following specification and by reference to the accompanying drawing, in which an example of the invention is shown, and wherein:

Figure 1 is a side elevation of a furnace constructed in accordance with the invention, Figure 2 is a longitudinal sectional view, Figure 3 is an end view of the furnace, and Figure 4 is a transverse vertical sectional view taken on line 4—4 of Figure 2.

In the drawing the numeral 10 designates a cylindrical metal furnace, but which may be of any desired shape. The furnace is provided with caps 11 at each end, which are connected by longitudinal tie rod 12. A central tube 13, for containing a chemical or heating medium, has its ends closed and extends longitudinally through the furnace and the caps, and is fastened in the latter. The tube is provided on one of its projecting ends with an upwardly extending riser or header 14 which is closed at its upper end by a cap 15.

For forming a passage in the tube 13, a pipe 16 considerably less in diameter than said tube, extends axially therethrough. The tube and pipe are preferably made of steel, but any material suitable for the purpose may be used. One end of the pipe 16 is connected with a supply pipe 17 which is connected with a suitable source (not shown) for supplying liquid thereto. The other end of the pipe 16 is attached to a discharge pipe 18.

A refractory insulating jacket 19 surrounds the tube 13 and extends between the caps 11. An electrical heating coil 20 is wound around the jacket for heating the tube and a suitable heating medium or chemical 22, such as zinc or bromide, is placed in the tube. The chemical which is used has a relatively high boiling point and by maintaining this chemical substantially at such point, a constant heat is generated, and this heat is utilized to heat the pipe 16. The chemical, when heated to its boiling point, will vaporize or gasify. Thus, a liquid, such as hydrocarbon, passing through the pipe 16 will be heated and when sufficient heat has been applied the liquid will be converted into a gas.

The header 14, being exposed on all sides to the atmosphere, will have a lower temperature than the tube and the vapor and gases expanding into this header will be cooled and their latent heat dissipated, whereby the chemical will be maintained at substantially an even temperature. Thus, it will be seen that the excess heat being carried off from the tube into the header and there dissipated into the atmosphere, the temperature in the tube will be maintained at approximately the boiling point of the chemical and thereby a constant and substantially even heat obtained.

The liquid to be vaporized is passed through the pipe 16, which has been heated by the constant heat of the tube 13, and will be converted into a gas. Thus, a chemical which has the necessary boiling point to keep the pipe at the desired temperature to make for the most efficient operation, is selected. A suitable insulating material 23, such as asbestos fibre, is packed in the furnace between the coil and the outer walls of the furnace, whereby the waste of heat is prevented.

The operation of the furnace is as follows: A chemical 22 is placed in the tube 13 into the header 14. Any chemical having a boiling point sufficiently high to generate heat of a temperature adequate to convert the liquid into a gas, may be used. The heating coil 20 may now be energized, whereby the tube and chemical are heated. Any liquid which may be a hydrocarbon, such as pentane, passes through the pipe 16. As this liquid is heated, it is expanded and converted into a gas.

The excessively heated vapors or gases from the heated chemical after it has reached its boiling point, will expand or pass into the header. The tube 13 has one end extending out from the furnace and the header rises from this exposed end. The header and the exposed end of the tube being outside of the furnace and exposed on all sides to the atmosphere, will have a lower temperature than that portion of the tube within the furnace. It will be seen that when the excessively heated vapors pass into the exposed end of the tube and the header, the heat will be dissipated into the atmosphere. This cooling of the vapors will tend to pass them back into the tube and other excessively heated vapors will expand into the header. Thus, a circulation is formed whereby the excess heat is disposed of. The liquid passing through the pipe 16 will consume a large portion of the heat from the chemical. The header is used only as an expansion chamber to take care of the surplus heat. The pipe 16 being kept at a constant temperature, the liquid is converted into gas quicker, and the efficiency of the furnace is increased. It is obvious that the temperature of the pipe 16 will not rise very far above or fall very far below the boiling point of the chemical.

If a higher or lower constant heat is required, a chemical having a higher or lower boiling point, such as a mercury or lead solution, is inserted into the tube. In using different chemicals the procedure and action is the same, but the temperature of the pipe 16 is either higher or lower. It is pointed out that any means may be used for heating the tube and the invention is not to be limited to an electrical coil for accomplishing this purpose.

What I claim and desire to secure by Letters Patent is:

1. A furnace comprising, a body, a container passing through the body, a heat-transmitting medium within said container, an electrical heating element around said container for heating the medium, a header extending from the container, whereby the vapor from the heated medium will pass into the header and carry off excess heat from the medium wherein it is dissipated, and a conductor heated by the medium extending through said container for carrying a liquid therethrough, whereby the liquid may be heated and converted into a gas.

2. A furnace comprising a body, a closed chamber in said body, heating means surrounding said chamber, a heat-transfer medium in the chamber, a heat-dissipating vapor condenser communicating with said chamber to carry off the excess heat therefrom, and means extending through said chamber to form a heat-treating chamber, whereby a substance may be passed through the second chamber and be heated.

3. A furnace comprising, a body, a closed chamber adapted to hold a volatile heat-transfer medium extending through said body, a heater surrounding said chamber, a heat-dissipating vapor condenser connected with said chamber to carry off the excess heat therefrom by allowing hot vapor to escape from said chamber into the condenser, whereby the excessive heat of the vapor is dissipated and the cooled vapor returned to the chamber, and means extending through said chamber to form a heat-treating chamber.

4. A furnace comprising, a body, a closed chamber in said body, means for creating in the body around the chamber a zone of substantially constant heat of sufficient temperature to convert a liquid into a gas, a heat-transfer medium in the chamber, a heat-dissipating vapor condenser communicating with said chamber to carry off excess heat therefrom, whereby the heat in the body is maintained substantially at a predetermined degree of heat, and a conductor extending through said chamber to form a heat-treating chamber, whereby a liquid may be converted into a gas.

LON S. GREGORY.